Feb. 28, 1956 H. F. WEAVER ET AL 2,736,811
CALUTRON RECEIVER
Filed June 28, 1946 5 Sheets-Sheet 3

INVENTORS
HAROLD F. WEAVER
CHESTER M. VAN ATTA
BY
ATTORNEY.

Feb. 28, 1956
H. F. WEAVER ET AL
2,736,811
CALUTRON RECEIVER
Filed June 28, 1946
5 Sheets-Sheet 4
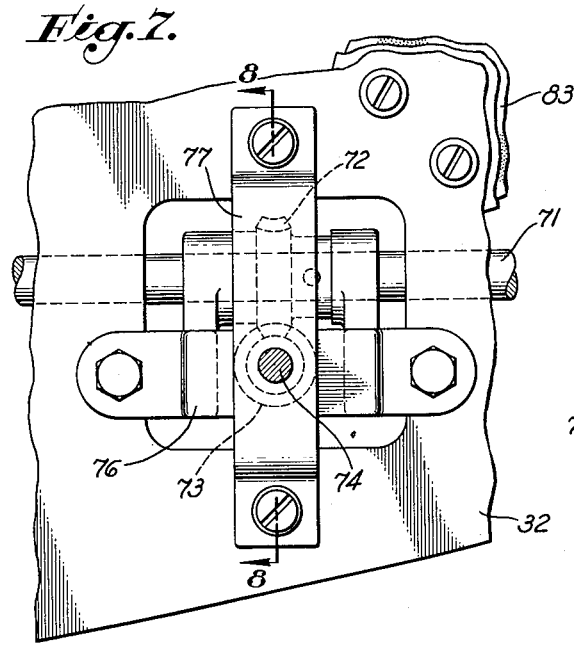
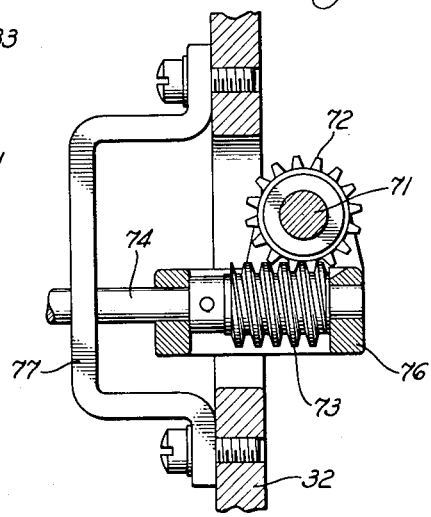
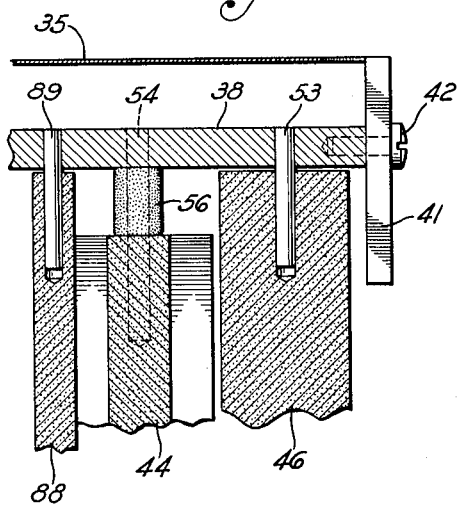
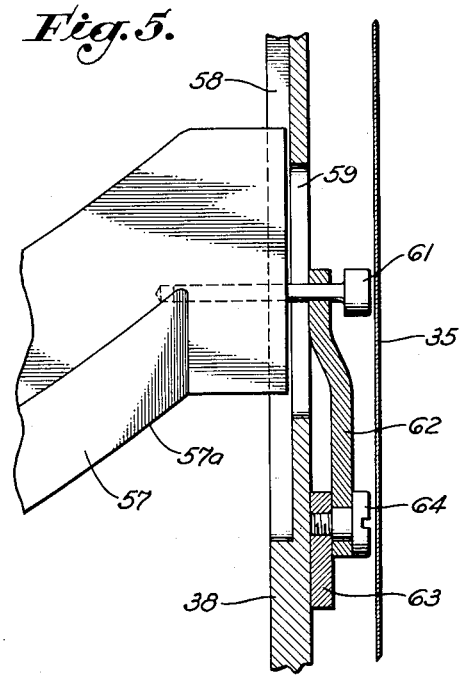
INVENTORS
HAROLD F. WEAVER
CHESTER M. VAN ATTA
BY *Robert A. Lavender*
ATTORNEY.

United States Patent Office 2,736,811
Patented Feb. 28, 1956

2,736,811

CALUTRON RECEIVER

Harold F. Weaver, Berkeley, and Chester M. Van Atta, Los Angeles, Calif., assignors to the United States of America as represented by the United States Atomic Energy Commission Application June 28, 1946, Serial No. 679,952

13 Claims. (Cl. 250—41.9)

The general subject of this invention involves the separation, based on difference in mass, of minute particles, such as atoms, and especially the separation of isotopes of an element, or the separation of a portion of an element enriched with respect to a particular isotope on a scale yielding commercially useful quantities of the collected material.

The type of means or mechanism to which the invention relates is known as a "calutron," and correspondingly the method or process is known as a "calutron" method or process. For a complete disclosure of a calutron and its mode of operation, reference is made to the copending application of Ernest O. Lawrence, Serial No. 557,784, filed October 9, 1944, for "Methods of and Apparatus for Separating Materials" now Patent No. 2,709,222.

In its most simplified, presently acceptable form, the calutron comprises an evacuated tank disposed between the poles of an electromagnet so that the evacuated space within the tank is pervaded with a magnetic field of high flux density. Within the tank there is provided a "source unit" that includes means for supplying the polyisotope as a vapor or gas to an ionizing region, ionizing apparatus for producing positively ionized particles from the vapor, and an accelerating device maintained at a high negative electrical potential with respect to the ionizing apparatus for withdrawing the positive ions and imparting to each of them a predetermined energy in the form of substantially uniform velocities along paths generally normal to the direction of the magnetic field from a line virtual focus toward an elongated beam defining slit in the accelerating device disposed generally parallel to the direction of the magnetic field.

After passing through the beam defining slit, the accelerated ions continue to move transversely to the magnetic field and are constrained to travel along substantially arcuate paths having radii that vary with the masses of the particles (within a magnetic field of uniform intensity). By virtue of the accelerating slit construction, the paths for the ions of a given mass diverge from a median path to an extent determined by the geometry of the ionizing and accelerating devices and by such inhomogeneity as may exist in the magnetic field through which the ions travel. This divergence of the paths of travel of the ions of a given mass continues through the first 90° of arcuate travel from the virtual focus at the source unit, and then the paths converge during the next 90° and cross each other in a region of focus approximately 180° from the virtual focus. Thus, in effect, geometrical focusing of a ribbon-shaped stream of ions of a given mass is accomplished adjacent the 180° point, even though there is a relatively wide initial angle of divergence of the ions. Likewise, the ions of any other given mass travel along paths that define a ribbon-shaped stream coming to a similar focus approximately 180° from the virtual focus at the source unit.

A receiver is disposed within the vacuum tank adjacent the 180° foci of the isotope ions to be separated, for deionizing them and for separately collecting material from one or all of them as may be desired.

The paths of a stream of ions of a given mass do not all cross precisely at a 180° line focus, and the cross sectional area of the stream of ions at the region of sharpest focus thereof would normally have an elongated rectangular configuration of substantial width, the width varying with the angular divergence of the ions at the source. The quantity of material transmitted in the beam also varies with the angular divergence at the source, and, with streams of ions of the heavier elements, a practical minimum divergence for collecting commercial quantities of material produces 180° foci of such width that they overlap considerably. Thus, in practice, the quantities of material collectable at the receiver from one ion stream contain some material from the adjacent ion stream and are merely enriched with respect to a particular isotope.

When employing a uniform magnetic field within the calutron tank, the separation of ions of different isotopes having the same initial angular divergence is dependent solely upon the mass difference of the ions, and they are spaced apart at their respective 180° foci by an amount approximately equal to the difference in the diameters of their respective paths. By reducing the divergence of the beam at the beam defining slit, the widths of the respective 180° foci of streams of ions of different isotopes may be reduced and the amount of overlap of these foci correspondingly reduced. However, since the amount of material transmitted in the beam varies with the angular divergence at the source, the amount of overlapping of the 180° foci of streams of ions of different isotopes increases (and the obtainable degree of enrichment of collected material with respect to a particular isotope decreases) as the amount of material transmitted in the beam is increased. As a result, a compromise was originally required between maximum production and maximum enrichment.

In order to increase the quantity of material transmitted in an ion beam without reducing the isotopic enrichment of the collected material, the shape or configuration of the beam may be modified by means of specially contoured bodies of magnetically permeable material that are introduced into the calutron tank to cause predetermined variations in the magnetic field along the path of the beam. Such magnetically permeable bodies are referred to as "magnetic shims," and the resulting modified beam is referred to as a "magnetically shimmed beam" or a "shimmed beam." In a copending application of Julius Robert Oppenheimer et al., Serial No. 637,690, filed December 28, 1945, now Patent No. 2,719,924, an arrangement of magnetic shims is disclosed, and the configuration of the modified beam resulting from the use of the shims is illustrated and described in some detail. As disclosed in that application, the modification of the beam is such that the normally elongated, rectangular, 180° focal pattern of each beam component is compressed along one side, is extended along the opposite side, and, in addition, is curved to produce what may be termed a "gull-wing" pattern.

By modifying the 180° focal patterns in this manner, the average width of the pattern for each isotope ion stream is reduced, and the length thereof is increased, whereby the amount of overlapping of the streams of different isotopes is substantially reduced for any given initial angular divergence at the source. This permits increasing the amount of material arriving at the 180° foci of the streams of different isotopes by employing a greater angular divergence at the source without contaminating the material arriving at one 180° focus with material arriving at the adjacent overlapping focus to nearly the extent formerly resulting when a magnetic field of substantially uniform intensity was employed.

However, a study of the locations of the 180° foci of the maximum sharpness for streams of ions of different isotopes constituting an ion beam has revealed that the above described modification of the magnetic field causes a relative shifting of the foci for different isotopes along the general direction of the beam at the 180° region of focus. This phenomenon is discussed in the copending application of Sidney W. Barnes, Serial No. 640,103, filed January 9, 1946, that disclosed a receiver having a beam viewing face disposed at an appropriate angle with respect to the incident beam to compensate for this relative shifting of the foci for different isotopes.

Referring to the particular form of the calutron as a whole that is disclosed herein for illustrative purposes, the unit is one in which four uranium ion beams are transmitted in the evacuated space within a single tank from a multi-beam source unit to a battery of four receivers disposed in side-by-side relation. In this connection, reference is made to a copending application of Ernest O. Lawrence, Serial No. 536,401, filed May 19, 1946, now Patent No. 2,714,664, disclosing that a number of closely spaced beams may be transmitted from a multi-beam source unit, so that they intersect without interference as they travel toward respective regions of focus. As disclosed in the above-mentioned Oppenheimer, et al., application, each of the beams may have its focal pattern similarly modified by suitable magnetic shims, so that four, identical, interchangeable receivers may be employed for respectively receiving the four beams.

At the time the invention disclosed in the above-mentioned Barnes application was made, it was assumed that the focal pattern of maximum sharpness for the several isotope components of a magnetically shimmed beam were disposed in a common focal plane, and the orientation of the viewing face of the receiver with respect to the incident beam was intended to be such that the viewing face would coincide with the assumed common focal plane. Since that time, however, it has been learned that the focal patterns of maximum sharpness for the several isotope components of the beam do not lie in a common plane, and that the focal pattern of maximum sharpness for each individual isotope component of the beam actually lies on a warped surface.

The separation of beam components at the receiver and the separate collection of one or more of the components is accomplished by providing at the beam viewing face of the receiver, a separate beam delimiting slot for each component to be collected, the slot being employed to pass that component of the beam to a suitable pocket disposed behind the slot. When only one isotope component is to be collected, it may be necessary to employ a beam intercepting electrode for measuring accurately the intensity of another isotope component, e. g., when only the $U^{235}$ ion of uranium is to be collected from a uranium ion beam, it is necessary to employ an electrode for intercepting the many times more abundant $U^{238}$ isotope in order properly to focus the $U^{235}$ component on the $U^{235}$ slot. Under such circumstance, the current to the $U^{238}$ electrode provides practical means for determining the accuracy of focus of the beam and the condition of the beam during the collection run.

In order to collect in a pocket, or to intercept with an electrode, material comprising as high a percentage of the selected isotope component as possible, the position and configuration of the slot or the electrode should be such that its edges coincide exactly with the corresponding edges of the focal pattern of maximum sharpness for that isotope. In order precisely to achieve such coincidence, the receiver would have to be provided with a viewing face that is not only appropriately inclined with respect to the beam, but is also dished or warped to conform to the focal pattern of each component to be received. There are numerous reasons why it is impractical to employ dished or warped receiver viewing faces for production purposes when a large number of receivers are required for separating the isotope components of a commercial scale; and the principal object of the present invention is to provide a calutron receiver having a beam viewing face defining one or more beam receiving areas, such as slots or electrode surfaces or both, properly shaped and oriented to fit the focal patterns of the beam components respectively to be received thereby with as high a degree of accuracy as possible, and without employing elements having dished or warped surfaces. More particularly, it is an object of the invention to provide, for use in a large number of multi-beam calutron units, a receiver having a beam viewing face constructed in a manner practically suited for duplication in large numbers and yet adapted to fit the warped or non-planar focal patterns of the beams with a high-degree of accuracy.

The invention will be illustrated herein by a detailed disclosure of a receiver designed to collect the $U^{235}$ isotope from a uranium ion beam while employing the $U^{238}$ electrode for beam control purposes. It is to be understood, however, that the general principles upon which the invention is based are applicable to receivers for beams of ions of the heavier elements, such as plutonium, for example. It is also to be understood these principles are equally applicable where a plurality of slots (instead of one slot and an electrode) are employed for separately collecting a corresponding plurality of isotopes from a polyisotopic ion beam, and where one or more electrodes are employed for merely measuring the abundance of different isotopes in a polyisotopic ion beam.

Still other objects and advantages of the invention will become apparent from the following specification in which the various features of the invention, and of the particular embodiment thereof selected for illustrative purposes, will be described in detail with reference to the accompanying drawings, in which:

Fig. 5 is a fragmentary sectional view of one of the receivers shown in Fig. 1, the section being taken as indicated by the line 5—5 in Fig. 4;

Fig. 6 is another fragmentary sectional view of one of the receivers shown in Fig. 1, the section being taken as indicated by the line 6—6 in Fig. 4;

Fig. 7 is a fragmentary elevational view of one of the receivers shown in Fig. 1, looking at the back thereof;

Fig. 8 is another fragmentary sectional view of one of the receivers, the section being taken as indicated by the line 8—8 in Fig. 7.

Figure 1:
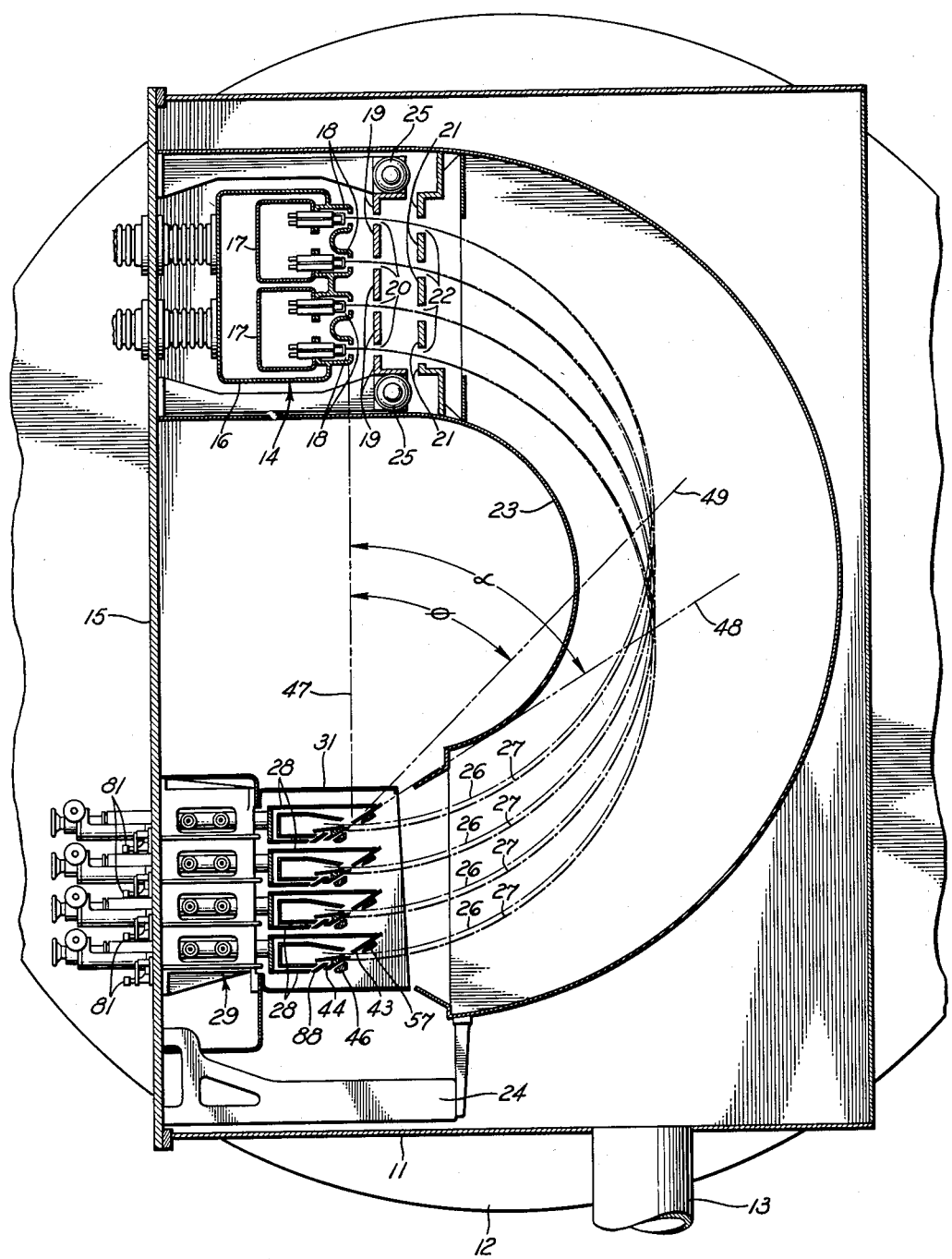
Figure 1 is a vertical sectional view of a calutron tank, showing the arrangement of the source and receiver within the tank and the relation of the tank to the magnet, certain parts being shown somewhat schematically for simplicity.

Referring to the drawings, Fig. 1 illustrates a calutron constructed in accordance with the general principles disclosed in the above-mentioned Lawrence application, Serial No. 557,784, but designed to transmit and receive four intersecting, non-interfering, ion beams within a single tank in accordance with the second Lawrence application mentioned above, Serial No. 536,401, the beams being magnetically shimmed in a manner (not shown) disclosed in the above-mentioned Oppenheimer, et al., application and described briefly in the foregoing discussion. The calutron shown in Fig. 1 comprises a tank 11 that is rectangular in elevation, as shown in Fig. 1, and is supported midway between a pair of vertically disposed, horizontally spaced-apart, pole faces 12 (only one being shown) of a calutron magnet, whereby a magnetic field may be created through the interior of the tank with the magnetic lines of force passing generally horizontally therethrough. The tank is adapted to be evacuated through a suitable pump-out conduit 13 to reduce the interior pressure in a manner disclosed in the above-mentioned Lawrence application, Serial No. 557,784. A source unit, illustrated schematically in Fig. 1, and generally designated 14, is mounted within the tank 11, adjacent the upper edge of a removable wall or face plate 15 thereof. The source unit 14 is adapted to produce, from a polyisotopic charge material, such as $UCl_4$, four intersecting, non-interfering beams of singly ionized positive ions traveling along substantially arcuate paths from the source unit toward respective regions of focus located approximately 180° along said paths adjacent the bottom edge of the tank face plate 15. As indicated above, the source unit 14 is designed to project the ions of any given mass, traveling within a particular beam, along paths that are initially divergent to either side of a median path dependent upon their respective initial angular divergence and upon the effects of the modified magnetic field through which the ions travel. In order to produce four such beams, the source unit 14 is provided with a main housing 16 containing two charge material reservoirs 17, in which charge material is vaporized. Charge material vaporized in the two reservoirs 17 flows into two pairs of ionizing chambers 18 respectively associated therewith, the ionizing chambers containing suitable electrical, arc-producing mechanisms adapted to ionize the vapor.

An arrangement of spaced-apart, ion accelerating electrodes 19 is disposed in front of the ionizing chambers 18, these electrodes being located so as to form a beam defining slot 20 in front of each of the four ionizing chambers 18. The electrodes 19 are mounted on any suitable framework, supported by insulators 25, whereby the electrodes may be maintained at a common, highly negative potential with respect to the source housing 16 and the equipment housed therein. By reason of the difference in potential between the electrodes 19 and the source housing 16, positive ions are withdrawn from the ionizing chambers 18, and substantially uniform kinetic energies are imparted to the ions in the form of velocities directed through the beam defining slots 20 between adjacent pairs of accelerating electrodes 19.

A similar arrangement of spaced-apart ion decelerating electrodes 21 is disposed in front of the accelerating electrodes 19 for defining four slots 22, respectively aligned with the four slots 20. The electrodes 21 are mounted on any suitable framework, that need not be insulated from the tank 11, whereby these electrodes are maintained at the ground potential of the tank. With a highly positive potential applied to the source housing 16, a relatively lower positive potential applied to the accelerating electrode 19, and ground potential applied to the decelerating electrodes 21, the ions accelerated between the ionizing chambers 18 and the slots 20 are partially decelerated as they travel between the slots 20 and slots 22. For a more detailed description of the purpose and mode of operation of the electrodes 19 and 21, reference is made to the copending application of Byron T. Wright, Serial No. 605,959, filed July 19, 1945.

Each of the four beams projected from the source unit 14 is schematically illustrated in Fig. 1 by a pair of diverging arcs 26 and 27 that respectively represent the $U^{235}$ and $U^{238}$ component of the beam. The relatively insignificant $U^{234}$ component of each beam is of insufficient density to be of any particular consequence. Because it is not considered in designing the particular calutron disclosed herein, it will be ignored hereinafter.

The ions in the four beams created by the source unit 14, in the manner described above, travel through a liner 23 that surrounds the four beams and supports the two sets of electrodes 19 and 21. This liner also surrounds the source unit 14 at one end, which end is secured to and supported by the tank face plate 15. The liner 23 is maintained at the same electrical potential as the decelerating electrodes 21, so that ions passing through the liner travel in a substantially uniform electrical field. At its lower end, the liner 23 is supported by a bracket 24 and is open to permit the four beams to continue therebeyond to respective, identical receivers, generally designated 28. The receivers are carried by a suitable adjusting mechanism geneally designated 29 and schematically illustrated in Fig. 1. This mechanism is preferably constructed so that the receivers may be individually moved back and forth along the general direction of travel of the beams at the receivers, and so that they may be rotated slightly about an axis extending in the same direction, whereby the receivers may be accurately positioned with respect to the beams to be received thereby for most efficient reception. To shield the receivers 28 and the adjusting mechanism 29 from bombardment by sideband material and low energy particles scattered from the edges of the open end of the liner 23, and to intercept additional material scattered from the receivers themselves, a housing 31, open at one end for admitting the beams, surrounds the battery of receivers 28 and the associated adjusting mechanism 29.

Figure 2:
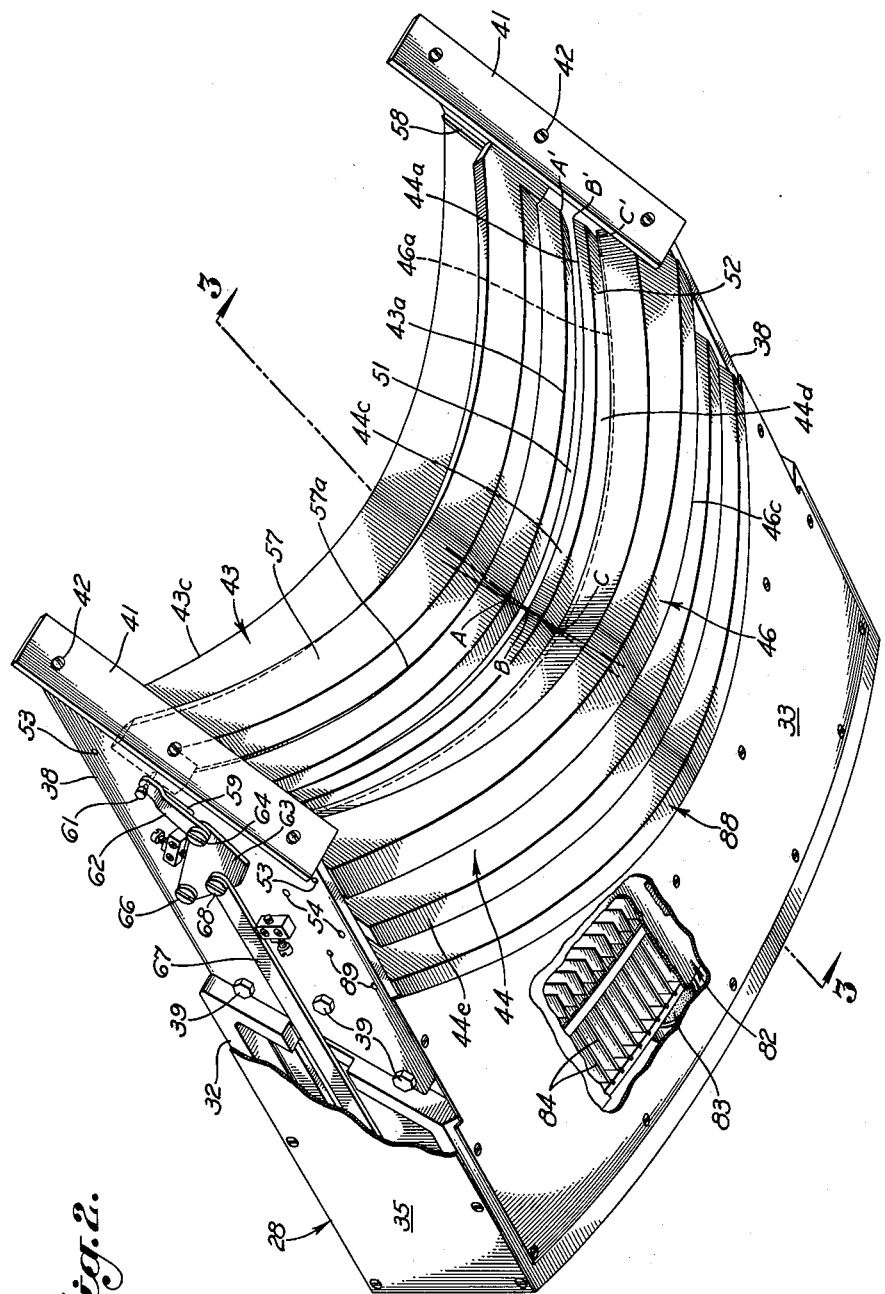
Fig. 2 is a perspective view of one of the receivers shown in Fig. 1, a portion of the receiver housing being broken away to show certain mechanism normally concealed thereby.
Figure 4:
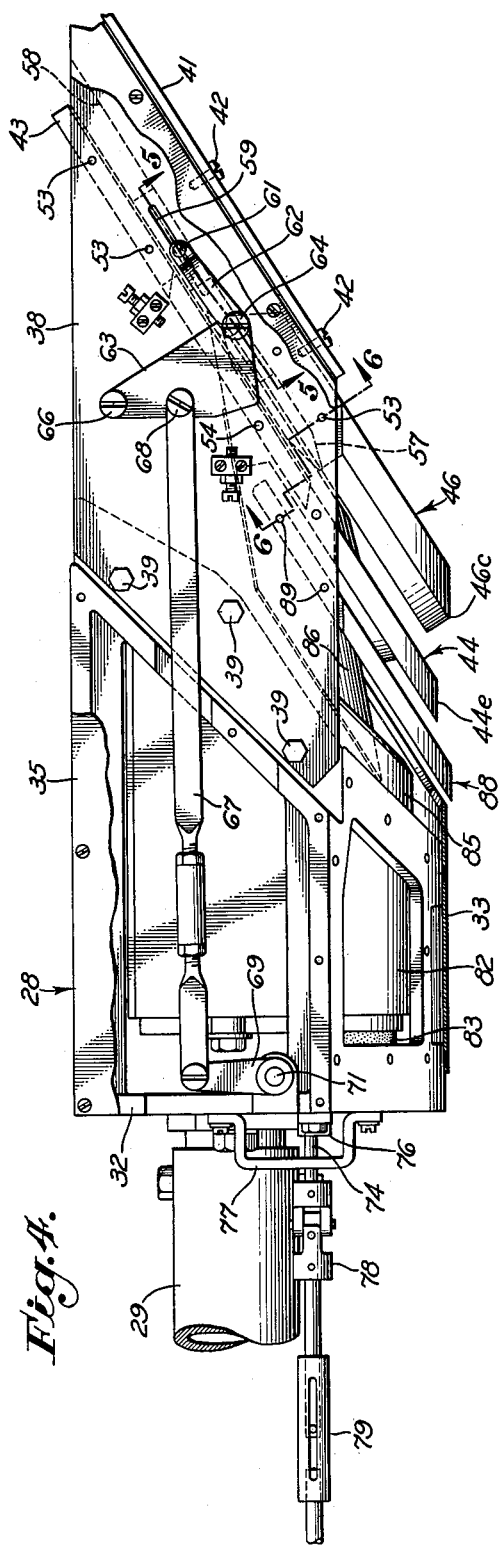
Fig. 4 is a side elevational view of one of the receivers shown in Fig. 1, a portion of the housing being broken away to show on a larger scale and in greater detail the mechanism similarly exposed in Fig. 2.
Figure 3:
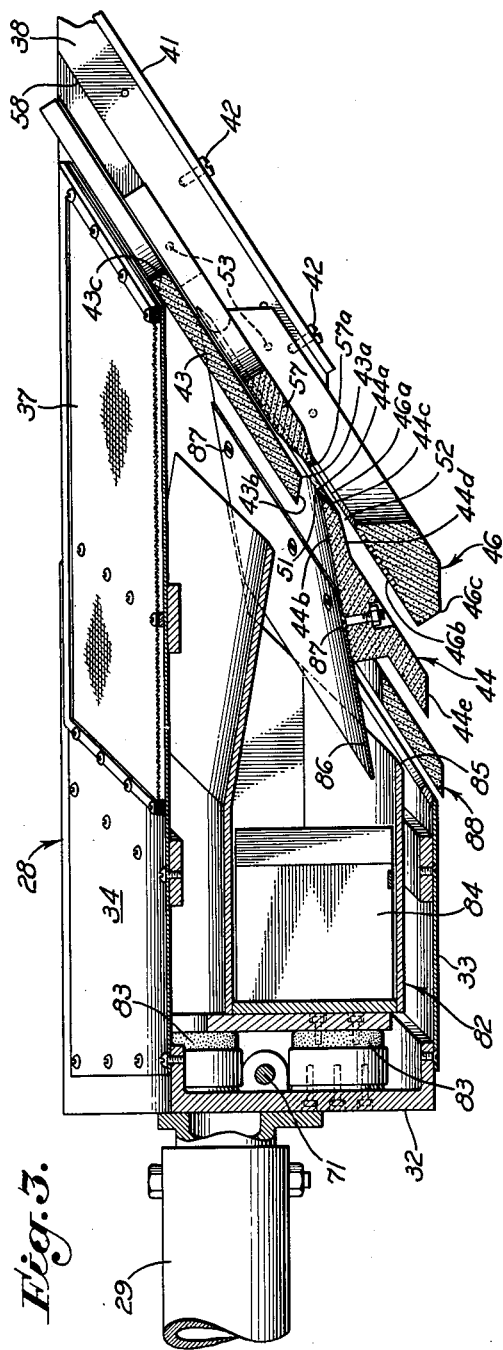
Fig. 3 is a vertical sectional view of one of the receivers shown in Fig. 1, the section being taken as indicated by the line 3—3 in Fig. 2.

One of the four receivers 28 is shown in Figs. 2 to 8 inclusive and will now be described in detail. Referring particularly to Figs. 2, 3, and 4, the receiver comprises a suitable open framework casting 32, preferably made of non-magnetic stainless steel and having an open end directed toward the beam to be received and adapted to be partially closed by a suitable beam viewing face structure described hereinafter. The top and bottom surfaces of the casting 32 are respectively concavely and convexly curved for a purpose also described hereinafter. The openings in the bottom, top, and sides of this framework are closed by suitable, removable, cover plates 33, 34 and 35; and a wire screen 37 (Fig. 3) is secured over the forward half of the top cover plate 34 for preventing particles scattered toward that area off of the inclined viewing face of an adjacent receiver from scattering a second time back toward the same adjacent receiver. The screen 37 tends to trap and hold the particles striking it, or penetrating it and rebounding from the surface of the cover plate 34.

The viewing face structure mounted in front of the forward open end of the casting 32 is carried by forwardly projecting side plates 38 that are secured to the casting 32 by bolts 39. The plates 38 are identical in all details except for being of opposite hand in certain minor respects. In addition to supporting the viewing face structure, these plates 38 provide walls upon which parts of a suitable door operating mechanism (described hereinafter) may be mounted. They also shield the viewing face to some extent from bombardment by particles scattered from the inner, side surfaces of the liner 23 and of the housing 31. A pair of plates 41, that are secured on the forward edges of the plate 38 by screws 42, provide additional protection for the receiver viewing face from bombardment by stray scattered particles.

The viewing face structure comprises three principal elements that are preferably formed of graphite and are disposed for defining a plurality of contiguous beam receiving areas. One of these elements is a flat graphite face plate 43 having one longitudinally extending edge conforming to a predetermined curve described hereinafter. Another one of these elements is a graphite block 44 that is similarly curved longitudinally and is mounted at its opposite ends on insulators (in a manner described hereinabter) so it can function as a current reading electrode. The third of these elements is another graphite block 46 that is similarly curved longitudinally and is disposed in front of the electrode 44 so as partially to shield it from bombardment by the incident beam.

Figure 9:
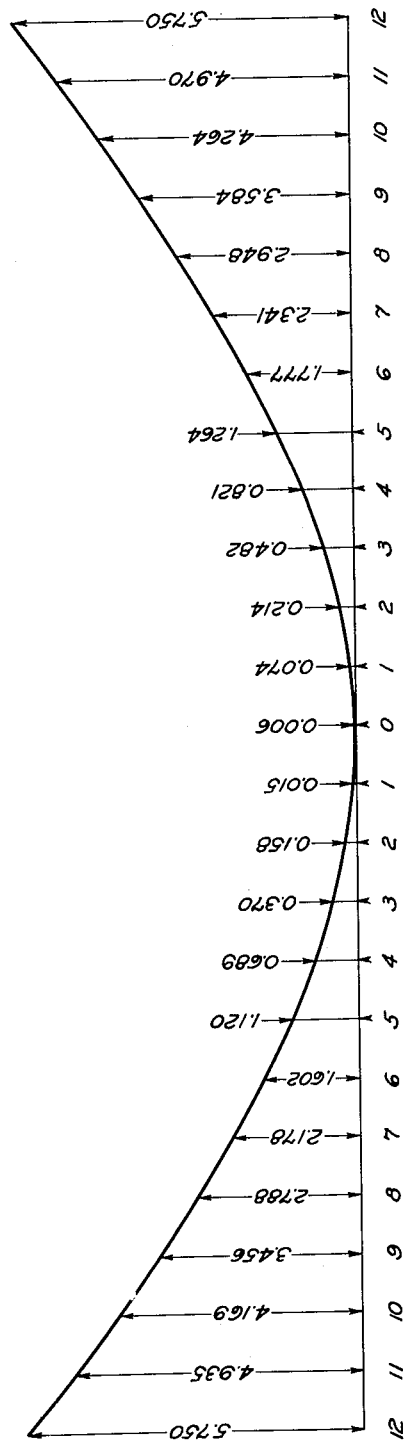
Fig. 9 is a profile view of a curve upon which the shapes of several beam delimiting members of each receiver are based.

The curvatures of the longitudinally extending, defining edges 43a, 44a and 46a of the elements 43, 44 and 46 are all identical and are selected to conform as accurately as possible to the curvature of the longitudinally extending, curved sides of the focal patterns of the $U^{235}$ and $U^{238}$ components of the beam when these curved edges are inclined at an appropriate common angle to the general direction of travel of the beam (tangent to the beam) 180° from its source. Both the shape of these curved edges and the orientation of the parallel planes in which they respectively lie being best determined experimentally from appropriate beam studies. Using as a reference a "source-receiver" plane 47 (Fig. 1) containing the line virtual focus of each beam at its source and passing through the foci of the beams 180° from their virtual foci, the planes in which the several curved edges should lie are parallel to the plane 48 (Fig. 1) that is inclined at an angle $\alpha$ with the source-receiver plane 47. Because the optimum angle $\alpha$ must be determined from experimental measurements, it is difficult, if not impossible, to determine its theoretically precise value. However, when employing the magnetic shims disclosed in the above mentioned Oppenheimer, et al., application, measurements taken indicated the optimum value for the angle $\alpha$ to be between 59° and 60°. Because it is substantially impossible to creat a perfect beam having foci that are confined within a perfectly sharp outline, it is also substantially impossible to determine by experimental measurements a theoretically precise optimum shape of a curve disposed in the plane 48 for fitting one longitudinal curved side of a focal pattern of the beam. However, the best curvature, as determined by measurements made while employing the shims disclosed in the above mentioned Oppenheimer, et al., application, is illustrated in Fig. 9 of the drawings together with the coordinates by which the curve is determined.

The face plate 43 is disposed with its forward surface parallel to the plane 48, whereby the convexly curved edge 43a is also disposed in a plane parallel to the plane 48. The narrow surface 43b adjoining the edge 43a is similarly curved and is inclined rearwardly and upwardly sufficiently to be free from direct ion bombardment.

The electrode 44 is disposed with its concavely curved edge 44a lying in a plane parallel to the plane 48, the concavely curved side 44b being inclined rearwardly and downwardly sufficiently to be free from direct ion bombardment. The narrow surface 44c of the electrode 44 is curved longitudinally from end to end in such a manner that any line in a vertical plane that intersects the curved defining edges 43a and 44a will also lie in the surface 44c. Expressing this relationship in a somewhat different manner, it will be observed that the face plate 43 and the electrode 44 are spaced apart in such a manner that their respective edges 43a and 44a define therebetween a nonplanar slot 51 having curved sides lying in respective planes parallel to the plane 48, whereby any lines such as A—B or A'—B' (Fig. 2), drawn in vertical planes, will also lie in planes parallel to a plane 49 (Fig. 1) disposed at an angle $\alpha$ with the source receiver plane 47. The optimum value for the angle $\alpha$ is substantially 45°, and to this extent the 45° relationship of the foci of the several isotope components of the beam disclosed in the above mentioned Barnes application is correct.

The element 46 is also disposed with its concavely curved defining edge 46a lying in a plane parallel to the plane 48, the element 46 being so positioned that extensions B—C and B'—C' of the lines A—B and A'—B', respectively, (Fig. 2) intersect the curved edge 46a. It may thus be seen that the electrode 44 and the element 46 are spaced apart in such a manner that their respective edges 44a and 46a define a non-planar area 52 containing the surface 44c of the electrode 44 and having curved sides lying in respective planes parallel to the plane 48. It will also be observed that this non-planar area 52 is offset from the slot 51 in a direction extending at an angle of 45° to the source-receiver plane 47 and to the general direction of travel of the beam 180° from its source. The portion of the beam passing through the area 52 will be partly intercepted by the surfaces 44c lying in that area and partly by the surface 44d that slopes rearwardly and downwardly therefrom.

The configuration of the slot 51 between the face plate 43 and electrode 44, determined by the relationships described above, will fit with a high degree of accuracy a selected portion of the width of the focal pattern of maximum sharpness of the $U^{235}$ component of the beam and will permit the portion of the beam comprising that component to pass through the slot for collection in a manner described hereinafter. The portion of the beam passing through the area 52 between the defining edges 44a and 46a of the electrode 44 and the element 46, respectively, and intercepted by the electrode 44 comprises a selected portion of the $U^{238}$ component of the beam, so that the current to the electrode 44 will provide a reliable indication of the accuracy of focus of the beam upon the viewing face of the receiver.

Since perfect resolution and complete separation of the components of the beam are not possible in practice, the adjacent focal patterns of different components shade into each other; and some $U^{235}$ material will strike the electrode 44. Thus, the narrower the slot 51 is made, the greater will be the purity of the $U^{235}$ material collected, but the smaller will be the total quantity of collected material. In the present instance, the slot 51 is made somewhat narrower than the theoretical width of the $U^{235}$ material; and the width of the area 52 is correspondingly increased, whereby a substantial quantity of $U^{235}$ material in the portion of the $U^{235}$ stream most contaminated with $U^{238}$ material is intercepted by the electrode 44.

When the receiver is employed to receive a uranium ion beam for the purpose of collecting material enriched with respect to the $U^{235}$ isotope, while separating therefrom material enriched with respect to the $U^{238}$ isotope, the material to be collected passes through the slot 51, and the substantial part of the material intercepted strikes the electrode 44. The portion of the beam striking the electrode 44 is the most intense portion of the entire beam cross section, and a relatively high concentration of neutralized particles are scattered or sputtered from the surface 44d of the electrode 44 toward the back side of the shielding element 46. Under normal conditions, material scattering or sputtering from a directly bombarded surface toward another surface not subject to direct bombardment tends to accumulate on the latter surface and to form thick leaves or flakes of considerable size. Possibly because of heating due to the bombardment, these leaves or flakes are inclined to warp so as to project substantial distances out from the surfaces on which they are formed. If the back surface of the shielding element 46 were a plain surface, scattered and sputtered material would then accumulate on this plain surface to such an extent that the leaves or flakes formed thereon would extend completely across the gap between that surface and the electrode 44. To overcome this defect and avoid electrical shorts between the electrode 44 and the shielding element 46, the back surface of the shielding element is grooved or otherwise cut to form an intaglio pattern entirely over that portion 46b of its back surface subject to intense secondary bombardment. The formation of such an irregular surface provides a greatly increased area subject to secondary bombardment, and the material deposited thereon has less of a tendency to peel off or crack loose. When the deposited material does peel off from such a thick surface, it is mostly in the form of short flakes rather than long slivers, such as form on a plane surface, and it has a lesser tendency to build up across the gap between the shielding element 46 and the electrode 44.

The curvature of the top and bottom of the casting 32 need only roughly approximate the curvature of the defining edges 43a, 44a, and 46a, as projected on to the plane 47, in order that the four receivers 28 may be disposed closely adjacent each other in more or less relation. In order that the concavely curved edge 43c of the face plate 43 will conform sufficiently closely to the concave curvature of the top side of the casting 32, it also need conform only approximately to the curvature of the defining edges 43a, 44a, and 46a. Similarly, the convex bottom side of the casting 32, the convex side 44e of the electrode 44 and the convex edge 46c of the element 46 need be separated only with sufficient accuracy to permit the desired close spacing of the receivers. The face plate 43 and the shielding element 46 are supported in their respective locations by the two plates 38 that project forwardly from opposite sides of the casting 32. Dowel pins 53 (Figs. 2, 4 and 6) are set in both ends of the face plate 43 and of the shielding element 46 and project in opposite directions from both of these members into the two plates 38. The electrode 44 is similarly mounted, except that insulator pins 54 are employed in this instance, and an insulator spacing sleeve 56 is disposed around each insulator dowel pin 54.

A door 57 is mounted in front of the face plate 43 for sliding movement parallel thereto, and is adapted to be moved between opened and closed positions with respect to the U$^{235}$ slot 51. The door is tapered to a thin edge 57a that is convexly curved in a plane parallel to the face plate 43 whereby, when the door is in its closed position, the edge 57a will extend slightly over the edge 44a of the electrode 44. When the door is in this closed position, a gap is defined between the edge 57a of the door and the edge 46a of the shielding element 46, whereby current to the electrode 44, resulting from the passage of ions through this gap and striking the electrode may be read for beam focusing purposes while the door is blocking the U$^{235}$ slot 51 against the admission of ions therethrough. In its open position, the door 57 is disposed out of the paths of the U$^+$ components of the beam (Figures 1 and 2).

The inner side of each forwardly projecting plate 38 has an elongated groove 58 cut therein, and the opposite ends of the door 58 respectively fit in these grooves. The grooves are of an appropriate length to permit a door to slide therealong between open and closed positions. Movement of the door 57 between its open and closed positions is effected by a mechanism mounted on the casting 32 and controlled from outside the calutron tank. This mechanism includes a pair of linkages, respectively mounted on opposite sides of the casting 32, that are identical except for being of opposite hand, and are suitably connected at the back of the casting 32 for simultaneous operation by means of a single control shaft described hereinafter. Only one of these linkages need be described in detail.

Referring now to the side of the receiver shown in Figure 4, a slot 59 is cut through the plate 38 within the outline of the groove 58, and a pin 61, that is set into the adjacent end of the door 57, projects through the slot 59 and into one end of a link 62. The link 62 is pivotally secured at its opposite end to a bell crank 63 by a pin 64, and the bell crank is pivotally mounted on the plate 38 by a pin 66. Thus, the door may be caused to slide back and forth in the groove 58 by oscillating the bell crank 63 about the pin 66. Pivotal movement of the bell crank 63 about the pin 66 is effected by a long link 67 that is pivotally secured at one end to the bell crank by a pin 68 and is pivotally secured at its opposite end to a crank 69 mounted on one end by a horizontally disposed rotatable shaft 71. The shaft 71 is suitably journaled in the casting 32 and extends the length of the casting for operative connection to the door operating linkage on the opposite side of the casting from the linkage just described.

As best shown in Figures 7 and 8, a gear 72, mounted on the shaft 71 adjacent the center thereof, is engaged by a worm at 73 on a shaft 74, whereby rotation of the shaft 74 will cause rotation of the shaft 71. The shaft 74 is suitably journaled in a bearing bracket 76 in a manner adapted to prevent axial sliding movement of the shaft 74 in its bearings. Another bracket 77 is secured to the back of the casting 32, and is apertured to accommodate and provide additional support for the shaft 74. Beyond the supporting bracket 77, the shaft 74 is provided with a universal joint 78, and an extensible joint 79, and the shaft 74 continues beyond the extensible joint 79, and passes through the tank face plate 15 to a suitable crank mechanism 81 by which the shaft 74 may be manually rotated from outside the tank. The universal joint 78 makes accurate alignment of the several segments of the shaft 74 unnecessary, and the extensible joint 79 permits the receiver to be moved in a direction generally parallel to the shaft 74 by the receiver support mechanism 29 for the purpose described above. Inside the casting 32 and behind the face plate structure described above, a pocket structure 82 of more or less conventional design is mounted on insulators 83 carried by the casting 32, whereby ions passing through the U$^{235}$ slot 51 will enter the pocket and be de-ionized and trapped therein. Being mounted on insulators, the pocket structure also functions as an electrode to which current may be read in a manner well known to those skilled in the art for determining the rate at which ions are received thereby. The pocket structure 82 has a suitably curved configuration conforming to the curvature of the casting 32 and contains series of inclined ion trapping blades 84, that respectively extend transversely of the pocket and are uniformly spaced apart from end to end thereof.

In order to prevent material entering the pocket 82 and striking an interior surface thereof from scattering or sputtering out of the pocket between the lower forward edge 85 thereof and the electrode 44, the electrode carries an appropriately curved plate 86 that is secured to the surface 44b of the electrode by suitable fastening elements 87. The plate 86 extends parallel to the surface 44b, and into the pocket 82 to a point somewhat beyond the lower forward edge 85 thereof. In order to prevent material scattered toward the lower surface of the receiver from the top surface of an adjacent receiver from finding its way into the pocket 82 through the space between the plate 86 and the lower forward edge of the pocket, a shielding member 88 is mounted on the plates 38 for intercepting such scattered material. The shielding member 88 is preferably made of graphite and is curved longitudinally to conform to the curvature of the other elements comprising the face plate structure. It may be secured at its opposite ends to the plates 38 by dowel pins 89 (Figs. 2, 4 and 6) in the same manner as the face plate 43 and the shielding element 46.

For simplicity, no apparatus has been shown for cooling various parts of the receivers that are subjected to intense heating as the result of ion bombardment. It will be understood, however, that any suitable arrangements of water cooling conduits or the like may be employed for this purpose.

When the battery of receivers 28 have been installed in the calutron tank in the relation shown in Figure 1, they function in the same general manner as receivers employed heretofor. At the conclusion of the run, access to the receivers is obtained by removing the tank face plate 15, thereby exposing the receivers sufficiently for them to be disassembled to the extent necessary for removing the pocket structure 82 to recover the material deposited therein. From the foregoing description, it will be apparent that a uniform face plate structure for a calutron receiver has been provided, which structure is relatively simple to duplicate in quantity for large scale commercial operation and yet is ideally suited to accomplish the specific objectives mentioned in the introductory portion of this specification. While a specific embodiment of the invention has been described in detail, it is to be understood that this has been done for illustrative purposes and that the invention is not limited thereby except as may be required by the appended claims.

What is claimed is:

1. In a calutron of the shimmed beam type, the combination comprising an evacuated tank, means for establishing a magnetic field through said tank, means disposed within said tank for projecting ions in beam form transversely of said magnetic field, and a receiver having a viewing face disposed in the path of the beam and defining a beam delimiting slot lying in more than one plane.

2. In a calutron of the shimmed beam type, the combination comprising an evacuated tank, means for establishing a magnetic field through said tank, means disposed within said tank for projecting ions in beam form transversely of said magnetic field, and a receiver having a viewing face disposed in the path of the beam and defining an elongated beam delimiting slot lying in more than one plane, opposite longitudinal edges of said slot being respectively curved in spaced-apart parallel planes.

3. In a calutron of the shimmed beam type, the combination comprising an evacuated tank, means for establishing a magnetic field through said tank, means disposed within said tank for projecting ions in beam form transversely of said magnetic field, and a receiver having a viewing face disposed in the path of the beam and defining an elongated beam delimiting slot lying in more than one plane, opposite longitudinal edges of said slot being respectively curved in spaced-apart parallel planes, and a pocket disposed behind said viewing face for deionizing and collecting ions passing through the slot.

4. In a calutron of the shimmed beam type, the combination comprising an evacuated tank, means for establishing a magnetic field through said tank, means disposed within said tank for projecting ions in beam form transversely of said magnetic field, and a receiver having a viewing face disposed in the path of the beam and comprising spaced-apart elements defining opposite sides of an elongated beam receiving area lying in more than one plane therebetween.

5. In a calutron of the shimmed beam type, the combination comprising an evacuated tank, means for establishing a magnetic field through said tank, means disposed within said tank for projecting ions in beam form transversely of said magnetic field, and a receiver having a viewing face disposed in the path of the beam and comprising spaced-apart elements having edges defining opposite sides of an elongated beam receiving area lying in more than one plane therebetween, said edges being respectively curved in spaced-apart parallel planes.

6. In a calutron of the shimmed beam type, the combination comprising an evacuated tank, means for establishing a magnetic field through said tank, means disposed within said tank for projecting ions in beam form transversely of said magnetic field, and a receiver having a viewing face disposed in the path of the beam and comprising spaced-apart elements defining two opposite sides of an elongated beam receiving area lying in more than one plane therebetween, said sides of said area being respectively similarly curved in parallel planes that are spaced apart so that corresponding points along said sides of said area define parallel lines intersecting said planes at a predetermined oblique angle.

7. In a calutron of the shimmed beam type, the combination comprising an evacuated tank, means for establishing a magnetic field through said tank, means disposed within said tank for projecting ions in the form of a plurality of beams transversely of said magnetic field, and a receiver having a viewing face disposed in the path of the beam and defining a plurality of beam receiving areas lying in more than one plane.

8. In a calutron of the shimmed beam type, the combination comprising an evacuated tank, means for establishing a magnetic field through said tank, means disposed within said tank for projecting ions in the form of a plurality of beams transversely of said magnetic field, and a receiver having a viewing face disposed in the path of the beam and defining a plurality of elongated beam receiving areas lying in more than one plane, the longitudinally extending sides of said areas being curved in spaced-apart substantially parallel planes.

9. In a calutron of the shimmed beam type, the combination comprising an evacuated tank, means for establishing a magnetic field through said tank, means disposed within said tank for projecting ions in the form of a plurality of beams transversely of said magnetic field, and a plurality of receivers each having a viewing face disposed in the path of one of the beams and defining a plurality of elongated beam receiving areas lying in more than one plane and having respective pairs of opposite longitudinally extending sides similarly curved in spaced-apart parallel planes.

10. In a calutron of the shimmed beam type, the combination comprising an evacuated tank, means for establishing a magnetic field through said tank, means disposed within said tank for projecting ions in the form of a plurality of beams transversely of said magnetic field, and a plurality of receivers each having a viewing face disposed in the path of one of said beams and defining a plurality of elongated beam receiving areas lying in more than one plane, said beam receiving areas having respective pairs of opposite longitudinally extending sides similarly curved in spaced-apart parallel planes with corresponding points along the lengths of said sides defining lines inclined at the same predetermined oblique angle to said parallel planes.

11. In a calutron of the shimmed beam type, the combination comprising an evacuated tank, means for establishing a magnetic field through said tank, means disposed within said tank for projecting ions in the form of a plurality of beams transversely of said magnetic field, and a plurality of receivers each having a viewing face disposed in the path of one of said beams and defining a plurality of elongated beam receiving areas lying in more than one plane, the longitudinally extending sides of said areas being similarly curved in spaced-apart substantially parallel planes, and sets of corresponding points along the lengths of said areas defining parallel lines inclined at a predetermined oblique angle to said parallel planes.

12. In a calutron of the shimmed beam type, the combination comprising an evacuated tank, means for establishing a magnetic field through said tank, means disposed within said tank for projecting ions in the form of a plurality of beams transversely of said magnetic field, and a plurality of receivers each having a viewing face disposed in the path of the beam and defining a plurality of elongated beam receiving areas lying in more than one plane, the longitudinally extending sides of said areas being similarly curved in spaced-apart substantially parallel planes disposed at a predetermined oblique angle to a median path of the beam.

13. In a calutron of the shimmed beam type, the combination comprising an evacuated tank, means for establishing a magnetic field through said tank, means disposed within said tank for projecting ions in the form of a plurality of beams transversely of said magnetic field, and a plurality of receivers each having a viewing face disposed in the path of the beams and defining a plurality of elongated beam receiving areas lying in more than one plane, the longitudinally extending sides of said areas being similarly curved in spaced-apart substantially parallel planes disposed at a predetermined oblique angle to a median path of the beam and so that sets of corresponding points at any location along said curves lie on a line making a greater predetermined oblique angle with a median path of the beam.

References Cited in the file of this patent

UNITED STATES PATENTS

| | | |
|---|---|---|
| 2,221,467 | Bleakney | Nov. 12, 1940 |
| 2,427,484 | West | Sept. 16, 1947 |